June 14, 1966 D. C. BRUNTON 3,255,629
MASS FLOW GAUGE FOR A NON-CONDUCTIVE MEDIUM
Filed Sept. 26, 1961 2 Sheets-Sheet 1

INVENTOR
Donald C. Brunton
By Anthony D. Cusano
ATTORNEY

June 14, 1966  D. C. BRUNTON  3,255,629
MASS FLOW GAUGE FOR A NON-CONDUCTIVE MEDIUM
Filed Sept. 26, 1961  2 Sheets-Sheet 2
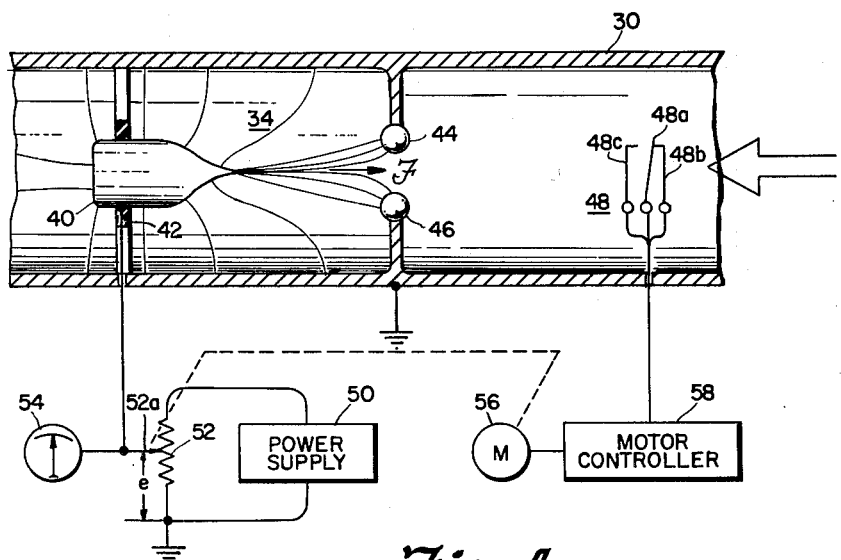
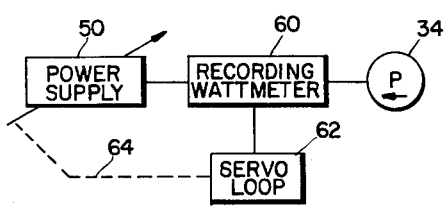
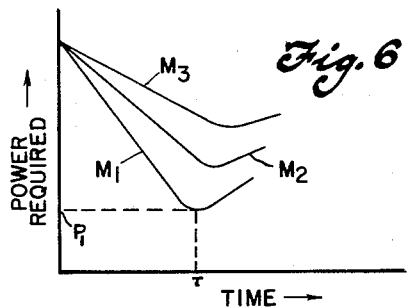
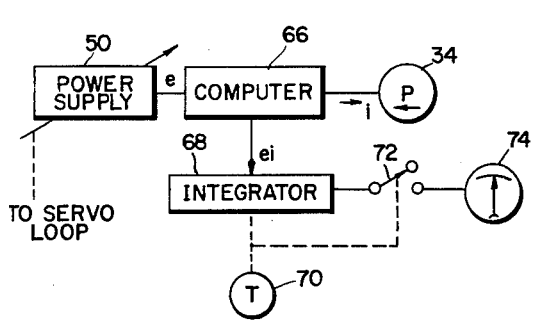
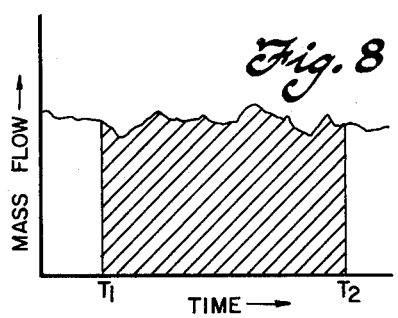
Inventor
Donald C. Brunton
By Anthony D. Cennamo
Attorney United States Patent Office 3,255,629
Patented June 14, 1966

3,255,629
MASS FLOW GAUGE FOR A NON-CONDUCTIVE
MEDIUM
Donald C. Brunton, Columbus, Ohio, assignor to Industrial Nucleonics Corporation, a corporation of Ohio
Filed Sept. 26, 1961, Ser. No. 140,883
3 Claims. (Cl. 73—194)

The present invention relates generally to flow gauges and more particularly to an improved method and means for measuring the mass flow of liquid dielectric materials.

Recent developments in space technology are being made through investigations performed by orbiting and sub-orbiting satellites and space vehicles. These flights are carefully planned and programmed to yield some desired information concerning a region or regions of space. To insure precise control of course and trajectory, the amount of propellant inserted in the vehicle prior to launch must be carefully chosen.

While solid propellants have been utilized, the reliability of liquid fuels and oxidizers such as liquid oxygen has been noted. Due to the extremely low temperatures involved, mass flow metering of these materials has been difficult. As a result, the initial mass of the vehicle, a quantity which must be known for flight computational purposes, is often in error.

Various mass flow metering devices have been proposed but each one suffers from one or more disadvantages, especially in measuring the cryogenic dielectric propellants commonly used. Most combine a velocity measurement and a density measurement to derive a mass flow functional signal. These systems are prone to the inevitable errors of two measuring operations and require considerable electronic equipment. Magnetic flowmeters cannot be used on nonconducting materials, and the turbine generator type usually cause an appreciable pressure drop upon insertion in the stream and lubrication difficulties arise as a result of the extreme operating temperatures encountered.

The present invention provides a mass flow gauge having no moving transducer element thereby causing substantially no loss in head pressure. A pair of electrodes are inserted in the stream to be measured and a non-uniform electric field is created which exerts a force tending to stop stream movement. The potential between the electrodes is augmented until fluid movement ceases. The magnitude of potential difference required is proportional to the mass flow of the stream.

Accordingly, it is a primary object of the present invention to provide a mass flow gauge having no moving parts.

It is another object of the present invention to provide a mass flow gauge that is easily adapted to various processes already in existence.

It is yet another object of the present invention to provide a mass flow gauge causing substantially no pressure loss upon insertion.

It is also an object of the present invention to provide a more accurate mass flow meter than heretofore obtainable.

It is an additional object of the present invention to provide a mass flow gauge requiring neither the complex computing circuitry nor the heavy duty power supplies of prior art devices.

These and other objects and advantages of the present invention will become more apparent when the following description is taken in conjunction with the drawings, in which:

FIG. 4 is a sectional view partly schematic of a mass flow gauge in accordance with the present invention;

FIG. 5 is a diagrammatic view of an alternative construction for the gauge shown in FIG. 4;

FIG. 6 is a graph of power required vs. time for the apparatus shown in FIG. 5;

FIG. 7 is a diagrammatic view of a mass totalizing instrument; and

FIG. 8 is a graph of mass flow vs. time useful in explaining the operation of the mass totalizer shown in FIG. 7.

Figure 1A:
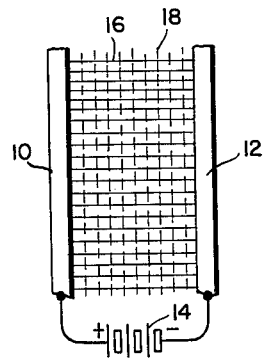
FIGS. 1a, 1b and 1c are sketches of various electric field configurations.
Figure 1B:
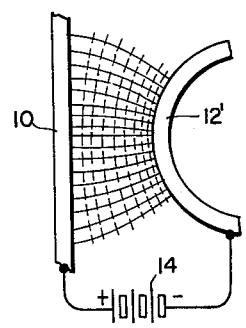
Figure 1C:
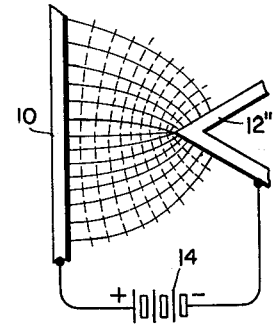

With reference now to the drawings and specifically to FIG. 1a, a pair of flat spaced electrodes 10 and 12 are connected to a D.C. source such as a battery 14. A uniform electric field 16 is created wherein lines of equipotential represented by the dotted lines 18 are substantially equally spaced in the region between the electrodes. However, in FIG. 1b wherein electrode 12' is curved, the lines of equipotential are more closely spaced near the curved electrode and where it most closely approaches the flat electrode. Progressing to the configuration shown in FIG. 1c, an exceedingly non-uniform field is created by making electrode 12" terminate in a point. While the field is difficult to draw accurately, it can be appreciated that the potential gradient rises very fast as the point is approached. If the point is sufficiently sharp and the supply voltage high enough, corona discharge may occur due to breakdown of the gap medium.

Figure 2:
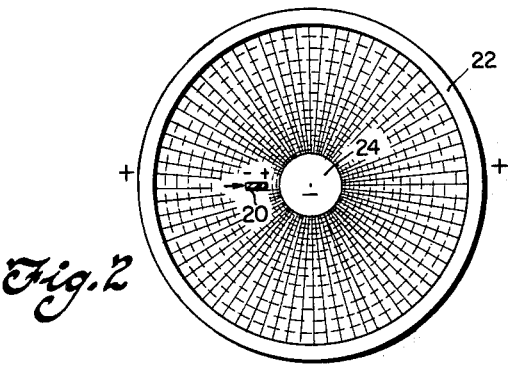
FIG. 2 is a sketch illustrating the phenomenon of dielectrophoresis.

Referring to FIG. 2, the phenomenon of dielectrophoresis utilized in the present invention is explained. Cylindrical electrodes 22 and 24 are separated by a dielectric medium not shown for purposes of simplifying the illustration. A molecule of the dielectric medium, however, is represented at 20. If the outer electrode 22 is charged positively and the inner electrode 24 negatively, the molecule tends to become electrically polarized as shown. Assuming that the dielectric is liquid or other substance free to move, due to the non-uniform electric field the attractive force exerted by the inner electrode 24 on the positive pole of the molecule will be slightly greater than the repulsive force exerted by this electrode on the negative pole of the molecule. The resultant force on the molecule 20 is directed toward the inner electrode. Therefore, the molecule migrates in the direction of highest potential gradient. A conservative electric field such as that used here can do not net work; that is, the net change of total energy must remain zero since no current flows in the external circuit. However, if the molecules are moved with sufficient force, they may be ionized at the high field electrode. The resultant negative ions will then be repelled and the electrons discharged from the electrode. Since now an electric current caused by the electrophoretic effect will flow, external work may be done and a current of ions is developed in the liquid away from the high field electrode. This current produces a force, due to its mass, that acts against the fluid force produced by the main stream. It may be advisable to enhance this ionizing mechanism by provision of an ion generator such as an alpha or beta radiation source in the vicinity of the high voltage electrode. It is therefore a combined dielectro-electrophoretic effect which causes the motion and repulsion of liquid relative to the high field electrode.

Figure 3:
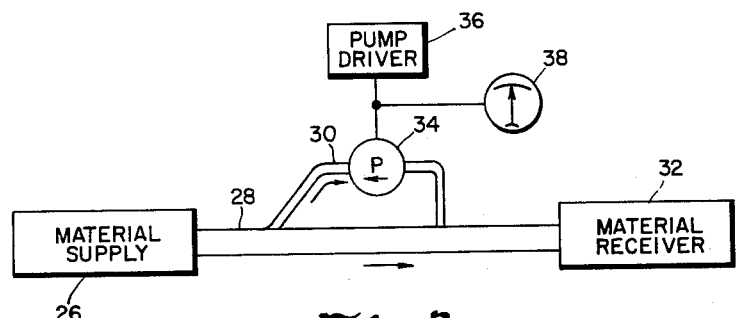
FIG. 3 is a diagrammatic view of a material transfer process comprising a preferred embodiment of the present invention.

Referring to FIG. 3, a dielectric material supply 26 is coupled to a conduit 28. The dielectric material is transmitted through a conduit 28 to a receiving vessel 32. It is generally desirable to measure the mass flow in tons per hour, for example, of the material into the vessel 32. In accordance with the present invention, a dielectric pump 34 is installed upstream from the receiver 32 in a bypass 30 and connected to a driver means 36. The pump 34 generates a reverse flow of the material in the bypass in accordance with the combined dielectro-electrophoretic effect described above in connection with FIG. 2. When the forward flow is exactly counteracted, i.e., when the condition of no material movement exists in the bypass, the power being supplied to the dielectric pump is proportional to the material mass flow. Any suitably calibrated indicator 38 may be connected to the output of the pump driver 36 to indicate the mass flow.

For a more detailed description, refer to FIG. 4 wherein the bypass 30 is shown devoid of moving material for purposes of clarifying the illustration. The direction of flow is indicated by the large arrow. The dielectric pump 34 comprises a first electrode 40 having a sharply tapering end portion and a generally cylindrical downstream portion insulatively mounted within the bypass 30 by means of a spider 42. A second electrode includes a pair of spherical conductors 44, 46 positioned within the bypass and commonly electrically connected with the wall of bypass 30. A material movement sensor 48 is positioned in the bypass to detect the null in the material movement. The sensor may be a piezoelectric crystal, a pressure transducer or a switch having a movable arm 48a actuated by the material and stationary contacts 48b and 48c.

A potential difference is created between the first and second electrodes by means of a power supply 50 and potentiometer voltage divider 52. The potential $e$ applied to the electrodes produces the E field configuration shown. A meter 54 indicates the potential $e$ existing on a movable arm 52a of potentiometer 52. The arm is adjustable by means of a two-phase servo motor 56 mechanically coupled thereto as indicated by the dotted line. A controller circuit 58 connected to the switch 48 controls the operation of the servomotor 56.

Briefly, the servo feedback loop operates to increase the potential $e$ until the force F exerted on the material is sufficient to stop flow. Whereupon the switch arm 48a rests in the neutral position and the servomotor 56 stops. In the event the force F becomes too large for a given mass flow M, switch arm 48a engages contact 48c and the servomotor is reversed to decrease the potential $e$. The construction of the controller 58 will be obvious to those skilled in the art.

Therefore, the potential $e$ necessary to stop material movement is proportional to the mass flow and may be accordingly read out on meter 54.

An alternative arrangement could be used to determine the moment of flow cessation. By observing the amount of electrical power consumed by the dielectric pump 34 it is possible to tell precisely when this condition obtains. Referring to FIG. 5 and 6, a recording watt-meter 60 may be connected between the power supply 50 and the dielectric pump 34. The watt-meter may compute the product of $e$ and $i$ or $ei \cos \theta$ depending on whether or not a D.C. or an A.C. power supply issued at 50. Although potentials of the order of several thousand volts may be used, the current flow consists primarily of a small displacement current. Therefore, the power consumed may be in the order of milliwatts. As seen from the graph, for a given mass flow $M_1$ the power required by the pump is maximum as the full flow is encountered by the pump 34 but it decreases to a minimum value $P_1$ as the material flow is stopped. For large mass flows $M_2$ and $M_3$ correspondingly greater power must be delivered to the pump 34 to stop the flow. This power is made available by the adjustable supply 50 and a coacting servo loop shown generally at 62. By well-known techniques, the servo loop 62 is made responsive to the power null hereinabove described to adjust the power output of the supply 50 as indicated at 64 until the minimum is attained. The balance point is reached on a short time $\tau$ which will vary slightly with the magnitude of mass flow encountered. Readout of mass flow on the watt-meter 60 can be made as soon as null balance is reached.

In addition to mass flow it may be desirable as in the case of space craft fueling to know the actual weight of material transferred within an interval of time. However, practically no industrial process is without variations. And variations in mass flow can complicate the computation of total mass. Accordingly, apparatus for deriving a signal proportional to total mass delivered to the receiver 32 is shown in FIG. 7.

With reference now to both FIGS. 7 and 8, a signal proportional to mass flow M is generated by a computer 66 and transmitted to an integrator 68. A timer 70 operates both the integrator 68 and a readout switch 72 connecting the output of integrator 68 to an indicator 74. The system is constructed to integrate the function plotted in FIG. 8 from $T_1$ to $T_2$. Thus the shaded area is proportional to the total transferred mass $$m = \int_{T_1}^{T_2} M dt$$

While the present invention has been illustrated and described in terms of rather specific apparatus, such illustration and description should not be regarded as limiting the scope of the present invention. Clearly, many electrode configurations of the dielectric pump are possible. Experimentation with various electrode sizes, shapes and spacings to produce the most effective field is not only desirable but oftentimes necessary. Moreover, many devices to detect the induced cessation of process movement are of equal utility. Accordingly, the only limitations are those recited in the following claims.

I claim:

1. Apparatus for measuring the mass flow of a dielectric material through a flow conduit, comprising a by-pass conduit around a portion of said flow conduit; a pair of electrodes mounted in said by-pass conduit, said electrodes being spaced in the direction of fluid flow therethrough and shaped to provide a non-uniform electric field therein; a power supply having adjusting means for applying a variable voltage across said electrodes to provide a variable force on said dielectric material to counteract the mass flow thereof through said by-pass conduit, means positioned in said by-pass conduit and responsive to movement of said material through said by-pass conduit for regulating said power supply voltage adjusting means to null said material movement, and means responsive to the adjusted value of said power supply voltage for quantitatively indicating said flow in said flow conduit.

2. Apparatus for measuring the mass flow of a dielectric material through a flow conduit, comprising a by-pass conduit around a portion of said flow conduit; a pair of electrically-chargeable electrodes mounted in said by-pass conduit and mutually spaced from each other in upstream and downstream relationship relative to the normal flow of said material in said by-pass conduit accompanying the flow thereof in said flow conduit, said electrodes being shaped to provide a non-uniform electric field therebetween having increased field strength in the region of said downstream electrode for ionizing particles of said dielectric material migrating to said downstream electrode whereby said ionized particles will be repelled toward said upstream electrode, a power supply having adjusting means for applying a variable voltage across said electrodes to provide a variable force on said dielectric material to counteract the mass flow thereof through said by-pass conduit, means positioned in said by-pass conduit and responsive to movement of said material through said by-pass conduit for regulating said power supply voltage adjusting means to null said material movement, and means responsive to the adjusted value of said power supply voltage for quantitatively indicating said flow in said flow conduit.

3. Apparatus as in claim 2 wherein said upstream electrode comprises a conductor having a relatively large, smooth area exposed to said dielectric material.

(References on following page)

References Cited by the Examiner

UNITED STATES PATENTS

| | | | |
|---|---|---|---|
| 1,451,064 | 4/1923 | Dunajeff | 73—212 |
| 2,357,199 | 8/1944 | Holst | 73—205 |
| 2,454,007 | 11/1948 | Reilly et al. | 73—183 |
| 2,945,443 | 7/1960 | Auer et al. | 103—1 |
| 3,135,207 | 6/1964 | Brown et al. | 103—1 |

OTHER REFERENCES

"Liquid Dielectrics in an Electric Field," article by W. H. Middendorf and G. H. Brown which appeared in the October 1958 issue of Power Apparatus and Systems, published by the American Institute of Electrical Engineers.

H. A. Pohl: J. Appl. Phys. 29, 1182-1188 (1958).

RICHARD C. QUEISSER, *Primary Examiner.*

ROBERT EVANS, *Examiner.*

J. G. MURRAY, L. R. FRANKLIN,
*Assistant Examiners.*